United States Patent [19]
Neureither et al.

[11] Patent Number: 5,948,276
[45] Date of Patent: Sep. 7, 1999

[54] PLASTIC SEPARATION METHOD

[75] Inventors: Jochen Neureither, Heidelberg; Karl-Heinz Unkelbach, Köln, both of Germany

[73] Assignee: Baker Hughes (Deutschland) GmbH, Cologne, Germany

[21] Appl. No.: 08/804,338

[22] Filed: Feb. 21, 1997

[30] Foreign Application Priority Data

Feb. 21, 1996 [DE] Germany .......................... 196 06 415

[51] Int. Cl.[6] ................................. B01D 21/26
[52] U.S. Cl. .................... 210/772; 210/781; 210/788; 210/805; 210/806; 209/4; 209/16; 209/153; 209/725; 241/20
[58] Field of Search .................... 210/767, 772, 210/787, 782, 788, 805, 806, 145.1, 205, 239, 294, 297, 304, 360.1, 380.1, 512.1; 241/20, 21; 209/4, 16, 155.72 S

[56] References Cited

U.S. PATENT DOCUMENTS

| | | | |
|---|---|---|---|
| 5,342,281 | 8/1994 | Unkelbach et al. | 494/53 |
| 5,390,860 | 2/1995 | Ali et al. | 241/20 |
| 5,518,616 | 5/1996 | Previero | 210/805 |

FOREIGN PATENT DOCUMENTS

| | | |
|---|---|---|
| 29 00 666 C2 | 7/1980 | Germany . |
| 42 08 104 A1 | 8/1993 | Germany . |

Primary Examiner—David A. Reifsnyder
Attorney, Agent, or Firm—Carl A. Rowold

[57] ABSTRACT

The present invention pertains to the separation of mixtures of plastics, contaminated with, among other things, mineral heavy materials such as e.g. sand or metal refuse. Separation occurs according to density in a separating liquid in the centrifugal field of the rotating suspension. The present invention provides the connection of a hydrocyclone before a separating centrifuge. The mineral heavy materials are separated in advance in the hydrocyclone and the plastic mixture is further separated in the centrifuge. Wear on components of the separating centrifuge caused by these heavy materials can be avoided, and in some applications a second separating stage at a higher separation density can be eliminated.

5 Claims, 3 Drawing Sheets

PLASTIC SEPARATION METHOD

FIELD OF THE INVENTION

The present invention is directed to methods and apparatuses for the wet-mechanical separation of solids of different densities.

BACKGROUND OF THE INVENTION

The present invention pertains to wet-mechanical separation of solids of different densities from mixtures of solid materials. The mixtures of solid materials may include, for example, home or industrial refuse mixtures. Such mixtures may consist of plastics contaminated with mineral heavy materials such as sands, or with other specifically heavy contaminants, for example metals. A separating liquid, whose density preferably lies between the densities of the solid materials to be separated, is added to the mixture of solid materials. Separation occurs in the centrifugal field of the rotating suspension formed from the solid materials and the separating liquid.

The wet-mechanical separation of solid materials according to density under the influence of centrifugal forces is already known.

In German document number DE-PS 29 00 666, a method for the separation of plastic waste is specified in which the separation ensues in the rotating suspension stream of a hydrocyclone. A disadvantage of the exclusive separation according to this method is the unsatisfactory separation effect, which leads to loss of solid material. Also, the required separation of the separating liquid from the solid matter fraction suspensions obtained must be implemented downstream.

These disadvantages are largely avoided in the separating centrifuge specified in German document number DE-PS 42 08 104, in which the separation ensues in the generated centrifugal field of a rotating container.

In this known, proven method for the separation of plastic mixtures in a separating centrifuge, the following problems can arise in some applications. If the material to be processed contains very large portions of fine-grained mineral contaminants (mineral heavy materials), an increased wear takes place on components of the separating centrifuge. In some applications there is a first stage in which heavy plastics have to be separated from light plastics and a second stage in which the heavy plastic (now as floating material) has to be separated from still heavier mineral contaminants (e.g. metallic strands in cable scrap). In such applications at separation densities of more than about 1.4 g/cm$^3$, the second stage is sometimes no longer economical, due among other things to the high consumption of salt.

Known methods for separating plastic mixtures include several settling/floating stages or hydrocyclone stages which are successively connected. Such methods already known for separating plastic mixtures always require more than two separating stages because the separation effect of the individual layers is significantly lower than that of the separating centrifuge. This leads to higher consumption of water and energy, whereby the losses of valuable plastic increase with each stage.

Thus, there are needs to improve methods and apparatuses for the wet-mechanical separation of solids of different densities. The present invention solves these and other needs.

SUMMARY OF THE INVENTION

The aim of the invention is to create methods and means in which the separation of solid materials according to density is further developed and improved, while largely avoiding the above-described disadvantages of known methods and means. Preferably, the present invention improves the separation of plastics from plastic mixtures.

By means of the inventive combination of a hydrocyclone with a separating centrifuge, the heavy materials are advantageously separated from, for example, a plastic mixture contaminated by mineral heavy materials or other specifically heavy contaminants, such as metals, for example. The separation of the heavy materials takes place in the hydrocyclone, which is connected upstream of the separating centrifuge, thus, before entry of the plastic contaminated mixture into the separating centrifuge. Wear of components of the separating centrifuge by these heavy materials no longer takes place. By means of the direct successive connection of the hydrocyclone and the separating centrifuge according to the invention, this separation of the mineral heavy materials without modification of the density of the separating liquid is possible. In other words, only one separating liquid is necessary.

An advantageous construction of the invention is the installation of the hydrocyclone directly in the line between the slurry container and the separating centrifuge. In this way, energy and equipment costs are saved.

However, it is also advantageously possible according to the invention to load the hydrocyclone from the slurry container in a separate circuit, and return the hydrocyclone overflow entirely or partially into the slurry container. In this way, an optimal hydrocyclone operation is possible, in view of varying job qualities (solid matter content of the suspension) of the suspension to be separated.

Further advantages, details and features of the invention are explained in more detail below on the basis of drawings in relation to exemplary embodiments.

DETAILED DESCRIPTION OF PREFERRED EMBODIMENTS

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
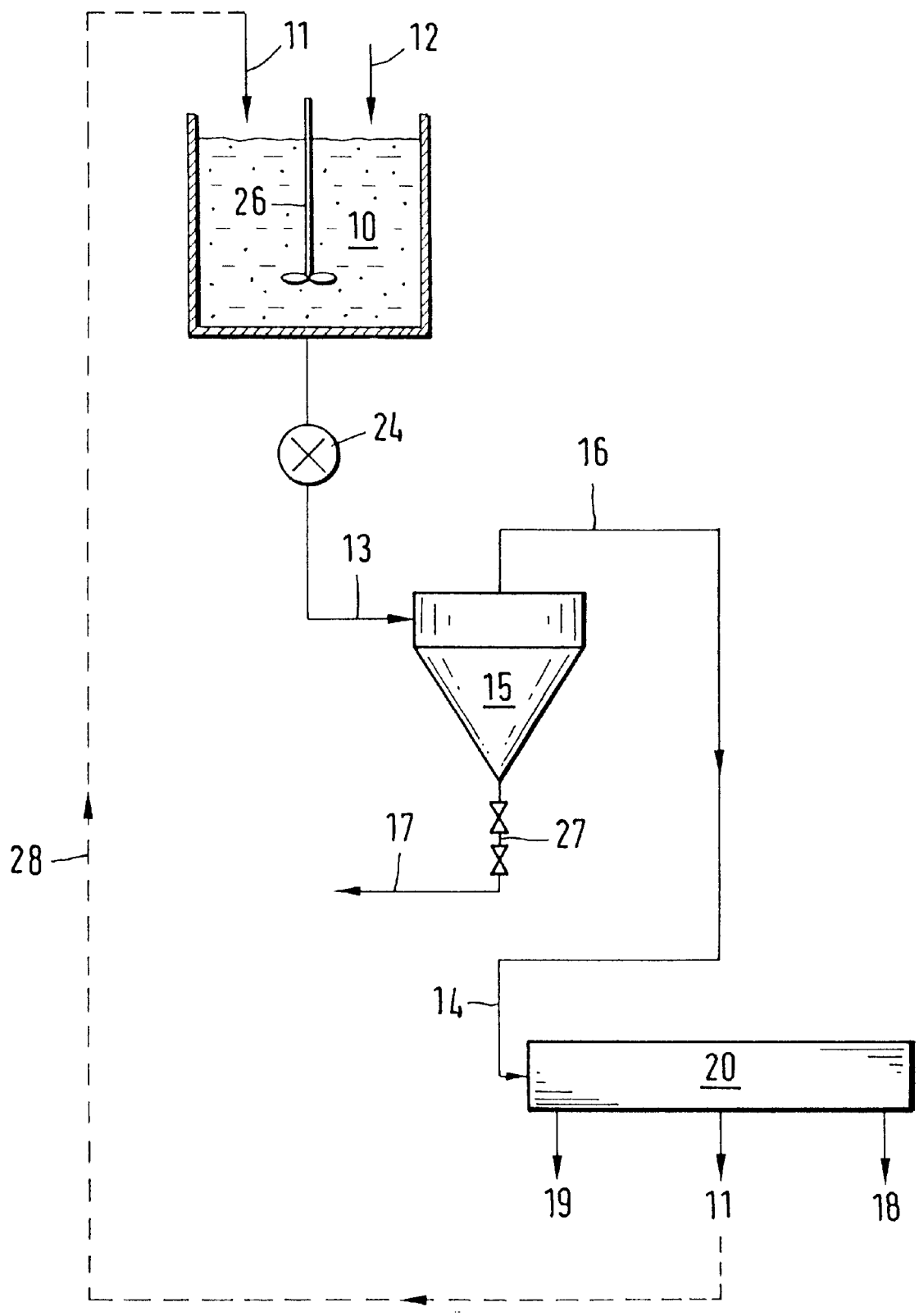
FIG. 1 shows a flow diagram with direct successive connection of the hydrocyclone and the separating centrifuge.

The flow diagram of FIG. 1 shows a slurry container (10) into which the separating liquid (11) and the solid materials (12) to be separated, preferably plastic mixtures, are introduced, and are mixed to form a suspension by means of a mixing apparatus (26).

This suspension is supplied to a hydrocyclone (15) by means of a conveyor pump (24) via its supply means (13). In the hydrocyclone there ensues a separation of the suspension into heavy goods, drawn off at the underflow (17) of the hydrocyclone via a sluice (27) and containing the mineral heavy materials to be separated, and light goods that exit at the overflow (16) and contain a plastic mixture largely freed of mineral heavy materials.

This overflow suspension now flows directly into the inlet means (14) of a separating centrifuge (20). In the separating centrifuge (20), there ensues the final separation of the plastic mixture, with the separating boundary of the density of the separating liquid, into heavy goods (18) and light goods (19), as well as into the separating liquid (11). The separating liquid (11) can be recirculated from the separating centrifuge (20) via the line (28) to the slurry container (10).

The flow diagram according to FIG. 1 is distinguished by a simple construction, because the hydrocyclone (15) is built directly into the supply line from the slurry container (10) to the separating centrifuge (20).

Figure 2:
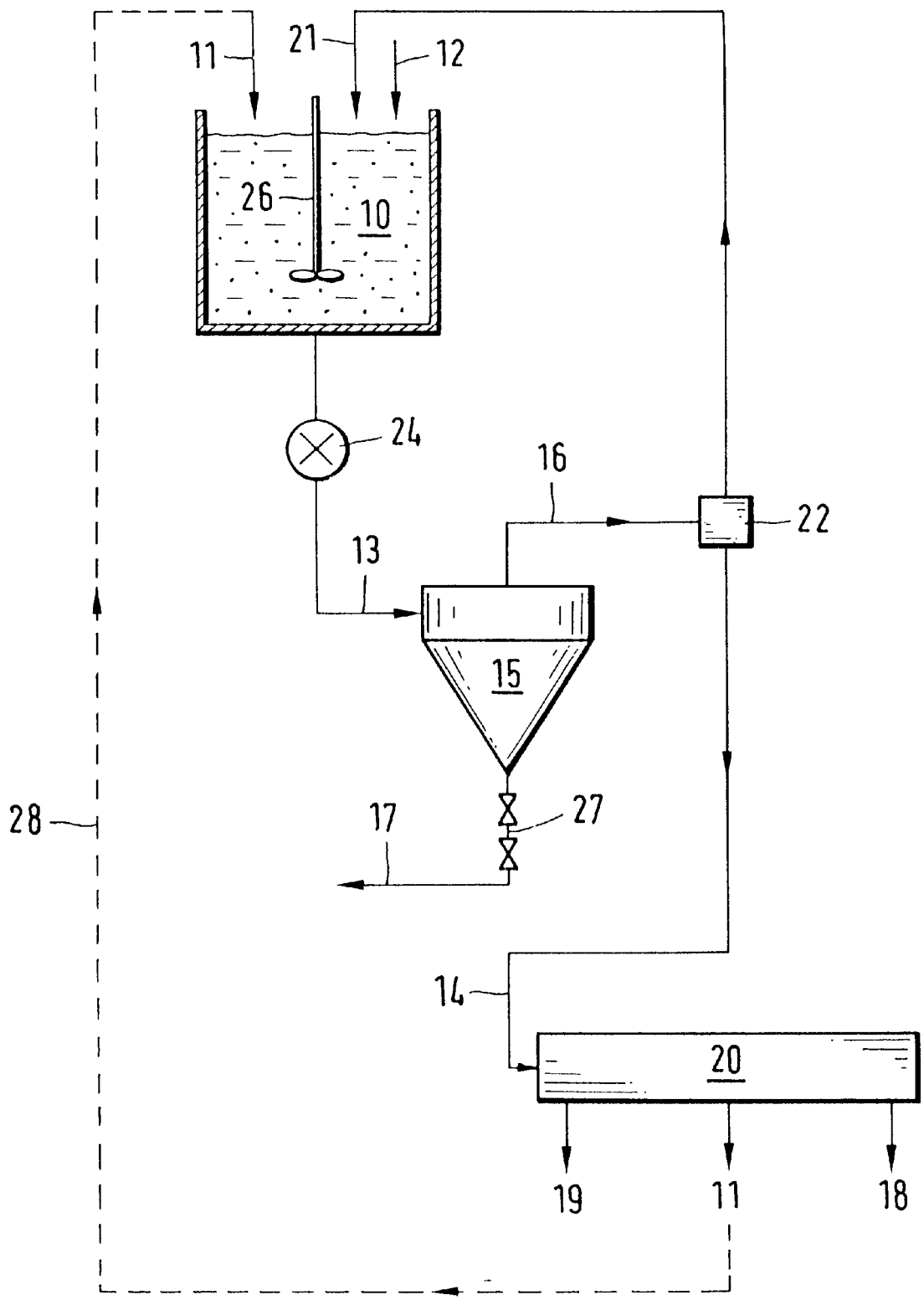
FIG. 2 shows a flow diagram with partial return of the hydrocyclone overflow.

In the flow diagram according to FIG. 2, an arrangement that is otherwise the same as in FIG. 1, a partial quantity of the hydrocyclone overflow suspension, dosed via a control element (22), is returned to the slurry container (10). With this arrangement, a stable operation of the separating centrifuge can be maintained even with larger throughput quantities of the hydrocyclone (15).

Figure 3:
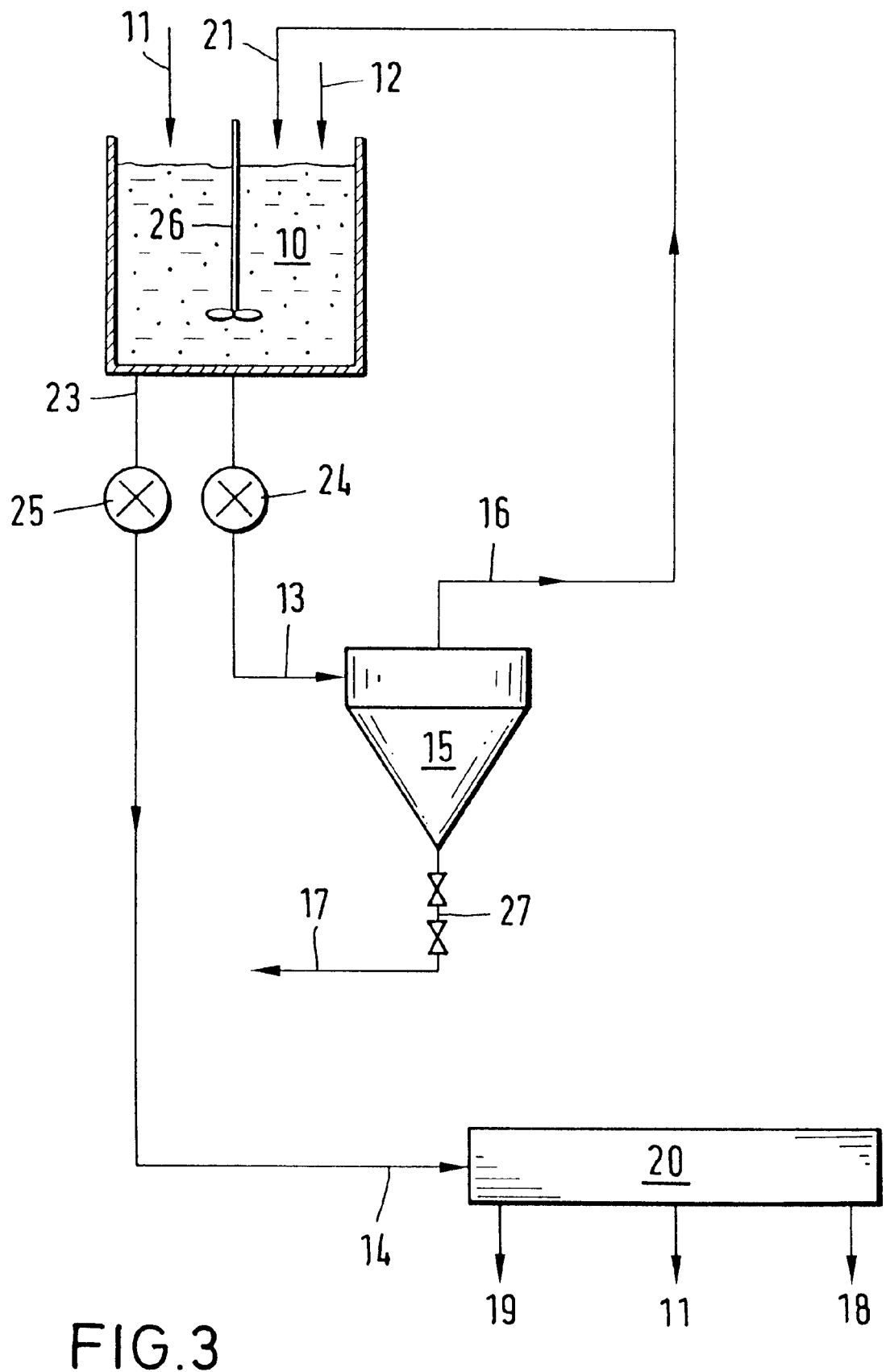
FIG. 3 shows a flow diagram with complete return of the hydrocyclone overflow.

For strongly fluctuating throughput quantities of the hydrocyclone (15), the circuit according to the flow diagram of FIG. 3 has proven successful. In this circuit, the entire hydrocyclone overflow suspension is returned to the slurry container (10) via the inlet (21). In this case, the supplying of the separating centrifuge (20) then ensues directly from the slurry container, via line (23) and via a separate supply pump (25).

The subject matter of the invention is explained in more detail on the basis of two examples.

The pre-disintegrated and more or less pre-cleaned plastic mixture, e.g. through hand sorting, is mixed with the separating liquid (water in the following examples) in a slurrying container with a density of 1 $g/cm^3$, using a mixer. Such mixture still contains heavy mineral portions. The resulting suspension is given to a hydrocyclone, which is so dimensioned, according to known methods, that the mineral heavy materials, whose densities are about 2.3 $g/cm^3$ for sand or higher for metals, are discharged to its underflow and the plastic mixture is discharged from its overflow. This overflow of the hydrocyclone is given to the separating centrifuge in which the separation of the heavy and the light plastic into two fractions then ensues, with separation of the separating liquid.

EXAMPLE 1

Heavily Soiled Foils or Films

After their disintegration, heavily soiled foils are mixed with water. Contaminants (mineral heavy materials) contained in the foil and water mixture are separated in the hydrocyclone. There subsequently ensues, at a separation density of 1 $g/cm^3$, the separation in the separating centrifuge of PO foils (density less than 1 $g/cm^3$) from other foils whose density is greater than 1 $g/cm^3$, e.g. PVC. Through this process the contaminant has largely been separated before the separating centrifuge. Accordingly, the wear on components of the separating centrifuge is minimal, resulting in a significant increase in the useful life of the separating centrifuge.

EXAMPLE 2

Recycling of Plastic Bottles

The disintegrated plastic bottles, made of PET or PVC and, respectively, PO, are mixed with water, and the suspension obtained is given first to the hydrocyclone. In the hydrocyclone there ensues a separation of contaminants present (mineral heavy materials). There subsequently ensues a separation of the remaining plastic mixture in the separating centrifuge at a separation density of 1 $g/cm^3$ in a light fraction (polyolefine portions) and a pure heavy fraction made of PVC or PET. A separation of the mineral heavy materials from this plastic heavy fraction is thus no longer required as compared to prior separating methods. The otherwise required second separating stage with a separating liquid of higher density is eliminated.

While the preferred embodiments have been illustrated and described, numerous changes and modifications can be made without significantly departing from the spirit and scope of this invention. Therefore, the inventors intend that such changes and modifications are covered by the appended claims.

We claim as our invention:

1. A method for wet-mechanical separation of solid materials having relatively heavy solid materials and relatively light plastic solid materials, the method comprising:
    a) providing a mixture of the solid materials having relatively heavy solid materials and relatively light plastic solid materials to be separated;
    b) adding a separating liquid to the mixture of solid materials having relatively heavy solid materials and relatively light plastic solid materials to form a suspension mixture having relatively heavy solid materials and relatively light plastic solid materials;
    c) loading the suspension mixture having relatively heavy solid materials and relatively light plastic solid materials into a hydrocyclone from a slurry container;
    d) separating at least a portion of the relatively heavy solid materials from the suspension mixture having relatively heavy solid materials and relatively light plastic solid materials in the hydrocyclone to form a suspension mixture having relatively light plastic solid materials and a substantially or completely reduced amount of relatively heavy solid materials;
    e) returning from the hydrocyclone, the suspension mixture having relatively light solid plastic materials and a substantially or completely reduced amount of relatively heavy solid materials to the slurry container;
    f) supplying the suspension mixture having relatively light plastic materials and a substantially or completely reduced amount of relatively heavy solid materials from the slurry container directly to a separating centrifuge for separation; and
    g) subsequently separating the suspension mixture having relatively light solid plastic materials and a substantially or completely reduced amount of relatively heavy solid materials in the separating centrifuge into fractions of solid materials and the separating liquid.

2. A method for wet-mechanical separation of solid materials having relatively heavy solid materials and relatively light plastic solid materials, the method comprising:
    a) providing a mixture of the solid materials having relatively heavy solid materials and relatively light plastic solid materials to be separated;
    b) adding a separating liquid to the mixture of solid materials having relatively heavy solid materials and relatively light plastic solid materials to form a suspension mixture having relatively heavy solid materials and relatively light plastic solid materials;
    c) loading the suspension mixture having relatively heavy solid materials and relatively light plastic solid materials into a hydrocyclone from a slurry container;

d) separating at least a portion of the relatively heavy solid materials from the suspension mixture having relatively heavy solid materials and relatively light plastic solid materials in the hydrocyclone to form a suspension mixture having relatively light plastic solid materials and a substantially or completely reduced amount of relatively heavy solid materials;

e) returning from the hydrocyclone a partial quantity of the suspension mixture having relatively light solid plastic materials and a substantially or completely reduced amount of relatively heavy solid materials to the slurry container;

f) directing the remaining quantity of the suspension mixture having relatively light solid plastic materials and a substantially or completely reduced amount of relatively heavy solid materials from the slurry container to a separating centrifuge; and g) subsequently separating the remaining quantity of suspension mixture having relatively light solid plastic materials and a substantially or completely reduced amount of relatively heavy solid materials in the separating centrifuge into fractions of solid materials and the separating liquid.

3. A method for wet-mechanical separation of solid materials having relatively heavy solid materials and relatively light plastic solid materials, the method comprising:

a) providing a mixture of the solid materials having relatively heavy solid materials and relatively light plastic solid materials to be separated;

b) adding a separating liquid to the mixture of solid materials having relatively heavy solid materials and relatively light plastic solid materials to form a suspension mixture having relatively heavy solid materials and relatively light plastic solid materials;

c) loading the suspension mixture having relatively heavy solid materials and relatively light plastic solid materials into a hydrocyclone from a slurry container;

d) separating at least a portion of the relatively heavy solid materials from the suspension mixture having relatively heavy solid materials and relatively light plastic solid materials in the hydrocyclone to form a suspension mixture having relatively light plastic solid materials and a substantially or completely reduced amount of relatively heavy solid materials;

e) directing the suspension mixture having relatively light solid plastic materials and a substantially or completely reduced amount of relatively heavy solid materials from the hydrocyclone to a separating centrifuge;

f) separating the suspension mixture having relatively light solid plastic materials and a substantially or completely reduced amount of relatively heavy solid materials in the separating centrifuge into fractions of solid materials and the separating liquid; and g) recirculating the separating liquid supplied by the separating centrifuge to the slurry container, which contains a subsequent mixture of solid materials having relatively heavy solid materials and relatively light plastic solid materials to form a subsequent suspension mixture.

4. A method for the wet-mechanical separation of solid materials comprising the steps of:

providing a slurry container;

supplying a mixture of solid materials to be separated to the slurry container wherein the solid materials comprises plastics having different densities contaminated with heavy materials;

supplying a separating liquid to the mixture of solid materials comprising plastics having different densities contaminated with heavy materials in the slurry container, wherein the separating liquid has a density between the densities of the plastic materials;

mixing the mixture of solid materials comprising plastics having different densities contaminated with heavy materials and the separating liquid in the slurry container to form a suspension mixture comprising plastics having different densities contaminated with heavy materials;

supplying the suspension mixture comprising plastics having different densities contaminated with heavy materials to a hydrocyclone;

separating the suspension mixture comprising plastics having different densities contaminated with heavy materials in the hydrocyclone into a portion having relatively heavy materials and portion having relatively light plastic materials;

supplying the portion of the suspension mixture having relatively light plastic materials to a separating centrifuge;

separating the portion of the suspension mixture having relatively light plastic materials in the separating centrifuge into relatively lighter plastic materials, relatively heavier plastic materials and the separating liquid; and returning the separating liquid to the slurry container.

5. A method for the wet-mechanical separation of solid materials comprising the steps of:

providing a slurry container;

supplying a mixture of solid materials to be separated to the slurry container wherein the solid materials comprises plastics having different densities contaminated with heavy materials;

supplying a separating liquid to the mixture of solid materials comprising plastics having different densities contaminated with heavy materials in the slurry container, wherein the separating liquid has a density between the densities of the plastic materials;

mixing the mixture of solid materials comprising plastics having different densities contaminated with heavy materials and the separating liquid in the slurry container to form a suspension mixture comprising plastics having different densities contaminated with heavy materials;

supplying the suspension mixture comprising plastics having different densities contaminated with heavy materials to a hydrocyclone;

separating the suspension mixture comprising plastics having different densities contaminated with heavy materials in the hydrocyclone into a portion having relatively heavy materials and portion having relatively light plastic materials;

supplying the portion of the suspension mixture having relatively light plastic materials to the slurry container;

supplying the portion of the suspension mixture having relatively light plastic materials from the slurry container to a separating centrifuge; and separating the portion of the suspension mixture having relatively light plastic materials in the separating centrifuge into relatively lighter plastic materials, relatively heavier plastic materials and the separating liquid.

* * * * *